United States Patent
Ikebukuro (10) Patent No.: US 10,390,524 B2
(45) Date of Patent: Aug. 27, 2019

(54) RECIPROCATING MECHANISM OF SPINNING REEL AND SPINNING REEL COMPRISING THE SAME

(71) Applicant: Shimano Inc., Sakai, Osaka (JP)

(72) Inventor: Satoshi Ikebukuro, Osaka (JP)

(73) Assignee: Shimaon Inc., Osaka (JP)

(*) Notice: Subject to any disclaimer, the term of this patent is extended or adjusted under 35 U.S.C. 154(b) by 155 days.

(21) Appl. No.: 15/689,303

(22) Filed: Aug. 29, 2017

(65) Prior Publication Data
US 2018/0160665 A1    Jun. 14, 2018

(30) Foreign Application Priority Data

Dec. 9, 2016 (JP) ................................. 2016-239763

(51) Int. Cl.
*A01K 89/01* (2006.01)
*A01K 89/015* (2006.01)

(52) U.S. Cl.
CPC .... *A01K 89/0114* (2013.01); *A01K 89/01143* (2015.05); *A01K 89/01912* (2015.05); *A01K 89/01917* (2015.05); *A01K 89/015* (2013.01)

(58) Field of Classification Search
CPC ............ A01K 89/0114; A01K 89/0193; A01K 89/01912; A01K 89/011223
See application file for complete search history.

(56) References Cited

U.S. PATENT DOCUMENTS

| | | | |
|---|---|---|---|
| 1,608,490 A | 11/1926 | Catucci | |
| 4,865,262 A * | 9/1989 | Tsunoda | A01K 89/0114 242/241 |
| 5,308,017 A * | 5/1994 | Yoshikawa | A01K 89/0114 242/241 |
| 5,746,381 A * | 5/1998 | Miyazaki | A01K 89/0188 242/261 |
| 5,875,986 A * | 3/1999 | Miyazaki | A01K 89/0155 242/261 |
| 2003/0197081 A1* | 10/2003 | Chin | A01K 89/0114 242/242 |

FOREIGN PATENT DOCUMENTS

| | | |
|---|---|---|
| JP | 2504866 Y2 | 5/1996 |
| JP | 11-346611 A | 12/1999 |
| JP | 2008-54570 A | 3/2008 |

OTHER PUBLICATIONS

European Search Report of corresponding EP Application No. 17 19 5795.4 dated Apr. 30, 2018.

* cited by examiner

*Primary Examiner* — Emmanuel M Marcelo
(74) *Attorney, Agent, or Firm* — Global IP Counselors, LLP (57) ABSTRACT

A reciprocating mechanism includes a first supporting member, a second supporting member, and a biasing member. The worm shaft includes a shaft portion, a first shaft supporting portion having a spherical portion formed in a convex spherical shape at a distal end, and a second shaft supporting portion. The first supporting member includes a first bottom portion abutting the spherical portion. The second supporting member includes a second bottom portion abutting a distal end of the second shaft supporting portion. The biasing member biases at least one of the first supporting member and the second supporting member in an axial direction.

10 Claims, 12 Drawing Sheets

RECIPROCATING MECHANISM OF SPINNING REEL AND SPINNING REEL COMPRISING THE SAME

CROSS-REFERENCE TO RELATED APPLICATIONS

This application claims priority to Japanese Patent Application No. 2016-239763, filed on Dec. 9, 2016. The entire disclosure of Japanese Patent Application No. 2016-239763 is hereby incorporated herein by reference.

BACKGROUND

Field of the Invention

The present invention relates to a reciprocating mechanism, in particular to a reciprocating mechanism for a fishing reel that evenly winds a fishing line onto a spool.

Description of Related Art

Generally, fishing reels have a reciprocating mechanism for evenly winding a fishing line onto a spool when the handle is rotated. For example, spinning reels have an oscillating mechanism, which is a reciprocating mechanism, that comprises a worm shaft that is rotated when the handle is rotated, a slider that is reciprocated back and forth by the rotation of the worm shaft, and a guide shaft that guides the front and back movement of the slider. The worm shaft is supported by an axle bearing member, such as a bushing member, disposed on the reel body (refer to Japanese Laid-Open Patent Publication No. 2008-054570).

For example, if the worm shaft is supported by a bushing member, a preload is applied to the worm shaft using a biasing member, such as a wave washer, to suppress the backlash (vibration) of the worm shaft in the axial direction. However, if a preload is applied, the rotational torque of the worm shaft is increased; therefore, it is not preferable to apply a large preload, rather a small preload is desired. Consequently, it is difficult to sufficiently suppress backlash of the worm shaft in the axial direction.

SUMMARY

An object of the present invention is to provide a reciprocating mechanism for a fishing reel capable of suppressing an increase in the rotational torque of the worm shaft, even if a relatively large preload is applied to the worm shaft in a reciprocating mechanism of a fishing reel.

The reciprocating mechanism for a fishing reel according to one aspect of the present invention evenly winds a fishing line onto a spool mounted on a reel body. The reciprocating mechanism comprises a worm shaft, a first supporting member, a second supporting member, and a biasing member. The worm shaft comprises a shaft portion, on the outer surface of which are formed intersecting spiral grooves; a first shaft supporting portion supporting the shaft portion with respect on a reel body, disposed at a first end of the shaft portion and having a spherical portion at the distal end formed in a convex spherical shape; and a second shaft supporting portion for supporting the shaft portion with respect to the reel body, disposed at a second end of the shaft portion. The first supporting member has a bottomed tubular shape, comprising a first bottom portion that abuts the spherical portion of the first shaft supporting portion of the worm shaft, and is disposed on the reel body to support the first shaft supporting portion of the worm shaft. The second supporting member has a bottomed tubular shape, comprising a second bottom portion that abuts the second shaft supporting portion of the worm shaft, and is disposed on the reel body to support the second shaft supporting portion of the worm shaft. The biasing member biases at least one of the first supporting member and the second supporting member in the axial direction.

In the reciprocating mechanism, since the spherical portion formed in the first shaft supporting portion of the worm shaft abuts the first bottom portion of the first supporting member, the contact portion between the first shaft supporting portion of the worm shaft and the first bottom portion of the first supporting member is close to a point contact rather than a surface contact; therefore, the contact area between the two is small. It is thereby possible to suppress an increase in the rotational torque of the worm shaft, even if a relatively large preload is applied between the worm shaft, and the first and second supporting members.

Preferably, the second shaft supporting portion comprises a spherical portion that is formed in a convex spherical shape at the distal end. With this structure, since the contact area between the distal end of the worm shaft, and the first and second supporting members is further reduced, it is possible to suppress an increase in the rotational torque of the worm shaft.

Preferably, at least one of the first bottom portion of the first supporting member and the second bottom portion of the second supporting member protrudes in a convex spherical shape on the shaft portion side of the worm shaft, and abuts at least one of the first and the second shaft supporting portions of the worm shaft. In this case, since at least one of the first bottom portion and the second bottom portion, which abuts the first and the second shaft supporting portions is formed in a convex spherical shape, the contact area between the worm shaft, and the first and second supporting members is reduced.

Preferably, the first bottom portion of the first supporting member is recessed in a concave spherical shape. In this case, since the spherical portion of the first shaft supporting portion abuts the first bottom portion, which is recessed in a concave spherical shape, there is an automatic centering effect when a preload is applied between the worm shaft, and the first and second supporting members.

The reciprocating mechanism for a fishing reel according to another aspect of the present invention evenly winds a fishing line onto a spool mounted on a reel body. The reciprocating mechanism comprises a worm shaft, a first supporting member, a second supporting member, and a biasing member. The worm shaft comprises a shaft portion, on the outer perimeter surface of which are formed intersecting spiral grooves, and first and second shaft supporting portions for supporting the shaft portion on a reel body, respectively provided at the ends of the shaft portion. The first supporting member has a bottomed tubular shape, comprising a first bottom portion that protrudes on the shaft portion side of the worm shaft in a convex spherical shape and abuts the first shaft supporting portion of the worm shaft provided on the reel body to support the first shaft supporting portion of the worm shaft. The second supporting member has a bottomed tubular shape, comprising a second bottom portion that abuts the second shaft supporting portion of the worm shaft, disposed on the reel body to support the second shaft supporting portion of the worm shaft. The biasing member biases at least one of the first supporting member and the second supporting member in the axial direction.

In this reciprocating mechanism, since the first bottom portion of the first supporting member that protrudes in a convex spherical shape abuts the first shaft supporting portion of the worm shaft, the contact area between the first shaft supporting portion and the first supporting member is close to a point contact rather than a surface contact; therefore, the contact area between the two is small. It is thereby possible to suppress an increase in the rotational torque of the worm shaft, even if a large preload is applied between the worm shaft, and the first and second supporting members.

Preferably, the second bottom portion of the second supporting member protrudes on the shaft portion side of the worm shaft in a convex spherical shape. With this structure, since the contact area between the distal end of the first and second shaft supporting portions, and the first and second supporting members is further reduced, it is possible to suppress an increase in the rotational torque of the worm shaft.

Preferably, the biasing member has a through-hole that extends through the center and is disposed so as to abut the first supporting member, the first supporting member has a protrusion that is capable of extending through the through-hole in the center portion of an end surface, and the protrusion extends through the through-hole and abuts the reel body, when receiving a load in a direction opposite to the biasing direction of the biasing member. In this arrangement, even if a large load is applied in the direction opposite of the biasing direction of the biasing member due to, for example, a large impact such as the reel body falling, the protrusion of the first supporting member comes in contact with the reel body; therefore, it is possible to avoid shear fracture and falling out of the first bottom portion of the first supporting member.

Preferably, the reciprocating mechanism further comprises an elastic member for supporting at least one of the first supporting member and the second supporting member on the reel body, mounted on the outer perimeter of at least one of the first supporting member and the second supporting member. In this arrangement, since at least one of the first and second supporting members is supported on the reel body via an elastic member mounted on the outer perimeter of at least one of the first and second supporting members, it is possible to suppress the backlash in the radial direction of the worm shaft with the elastic member.

The reciprocating mechanism for a fishing reel, according to another aspect of the present invention, evenly winds a fishing line onto a spool mounted on a reel body comprising a worm shaft and a biasing member. The worm shaft comprises a shaft portion, on the outer surface of which are formed intersecting spiral grooves, and first and second shaft supporting portions for supporting the shaft portion with respect to a reel body, respectively provided at ends of the shaft portion. The biasing member comprises a projecting portion that protrudes on the shaft portion side of the worm shaft in a convex spherical shape, and abuts the first shaft supporting portion of the worm shaft to bias the worm shaft in the axial direction.

In this reciprocating mechanism, since the biasing member that abuts the first shaft supporting portion is formed in a convex spherical shape, the contact portion between the first shaft supporting portion and the biasing member is close to a point contact rather than a surface contact. Since the contact area between the first shaft supporting portion and the biasing member is small, it is thereby possible to suppress an increase in the rotational torque of the worm shaft, even if a large preload is applied to the worm shaft.

Preferably, at least one of the first shaft supporting portion and the second shaft supporting portion comprises a spherical portion formed in a convex spherical shape at the distal end. In this arrangement, for example when the distal end of the second shaft supporting portion is disposed abutting a supporting member, or the like, since the contact area between the distal end of the second shaft supporting portion and the supporting member is reduced, it is possible to further suppress an increase in the rotational torque.

According to the present invention, it is possible to suppress an increase in the rotational torque of the worm shaft, even if a large preload is applied to the worm shaft in a reciprocating mechanism for a fishing reel.

DETAILED DESCRIPTION OF THE EMBODIMENTS

Figure 1:
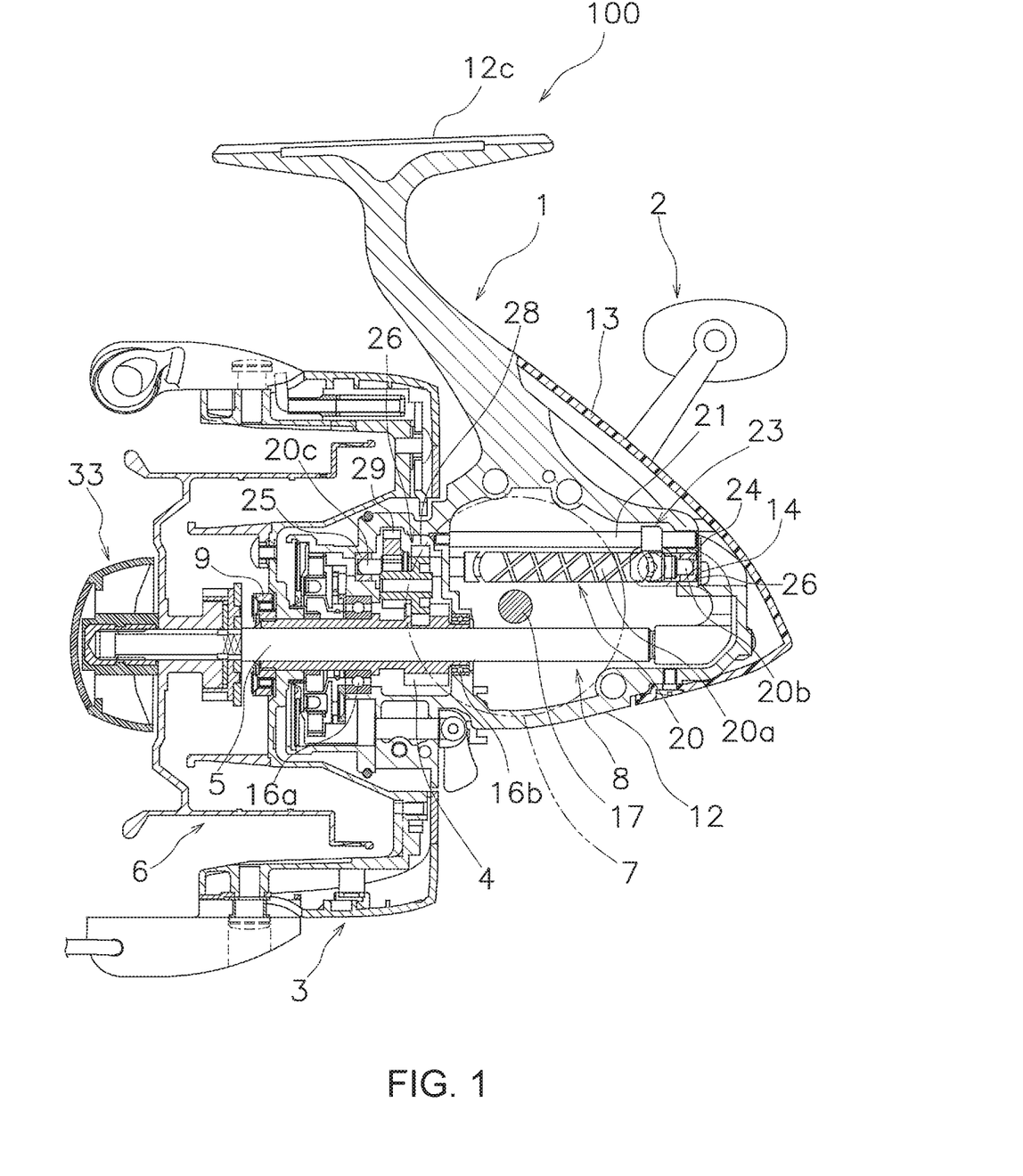
FIG. 1 is a lateral cross-sectional view of a spinning reel employing a first embodiment of the present invention.

The spinning reel 100 employing an embodiment of the present invention comprises a reel body 1, a handle 2, a rotor 3, a pinion gear 4, a spool shaft 5, a spool 6, a drive mechanism 7, and a reciprocating mechanism 8, as shown in FIG. 1. Meanwhile, in the following description, regarding the terms front and rear, when fishing, the direction in which the fishing line is unreeled is referred to as the front, and the opposite direction is referred to as the rear. Further, the left and right mean the left and right when looking at the spinning reel 100 from the rear.

The reel body 1 comprises a chassis 12, a main body guard 13, and a retainer plate 14.

The chassis 12 is a frame-like member that is open on both sides. The drive mechanism 7, the reciprocating mechanism 8, and the like are housed in the chassis 12. The side portion of the chassis 12 is open, and is closed by a lid member (not shown). The chassis 12 comprises a mounting portion 12c (refer to FIG. 1) disposed on the upper portion of the chassis 12. The mounting portion 12c is formed so as to extend in the front and rear directions. The mounting portion 12c is the portion that is mounted to the fishing rod.

The main body guard 13 is disposed at the rear of the reel body 1, and the rear portion of the reel body 1 is covered by the main body guard 13.

The retainer plate 14 is a plate-like member to hold and retain a guide shaft 21, a first supporting member 24, and a biasing member 26, to be described later. The retainer plate 14 is fixed to the rear portion of the chassis 12 by a plurality of screws, which are not shown.

As shown in FIG. 1, the handle 2 is disposed on the side of the reel body 1 so as to be rotatable with respect to the reel body 1.

The rotor 3 (refer to FIG. 1) winds the fishing line onto the spool 6. The rotor 3 is fixed to the front portion of the pinion gear 4, and is integrally rotated with the pinion gear 4.

The pinion gear 4 is a hollow, tubular member and is disposed on the reel body 1. The rotor 3 extends through the front portion of the pinion gear 4, and the rotor 3 is connected to the pinion gear 4 by a nut 9 so as to be integrally rotatable. As shown in FIG. 1, the pinion gear 4 is rotatably supported on the reel body 1 by an axle beating 16a and an axle bearing 16b, on the chassis 12 of the reel body 1.

The spool shaft 5 is disposed in the reel body 1, extending in the front-rear direction. The spool shaft 5 extends through the inside of the pinion gear 4.

The spool 6 has an outer perimeter on which the fishing line is wound. As shown in FIG. 1, the spool 6 is fixed to the spool shaft 5 by a knob member 33 that screws onto the tip of the spool shaft 5. The spool 6 is reciprocated in the axial direction of the spool shaft 5 (hereinafter referred to as the spool shaft direction) integrally with the spool shaft 5.

The drive mechanism 7 is formed by the drive shaft 17, and a drive gear (not shown) connected to the drive shaft 17. The drive gear is a face gear, and meshes with the pinion gear 4. The drive shaft 17 and the drive gear are rotated when the handle 2 is rotated, and the pinion gear 4 which meshes with the drive gear is also rotated. Accompanying the rotation of the pinion gear 4, the spool shaft 5 is reciprocated in the spool shaft direction by the reciprocating mechanism 8.

Figure 2:
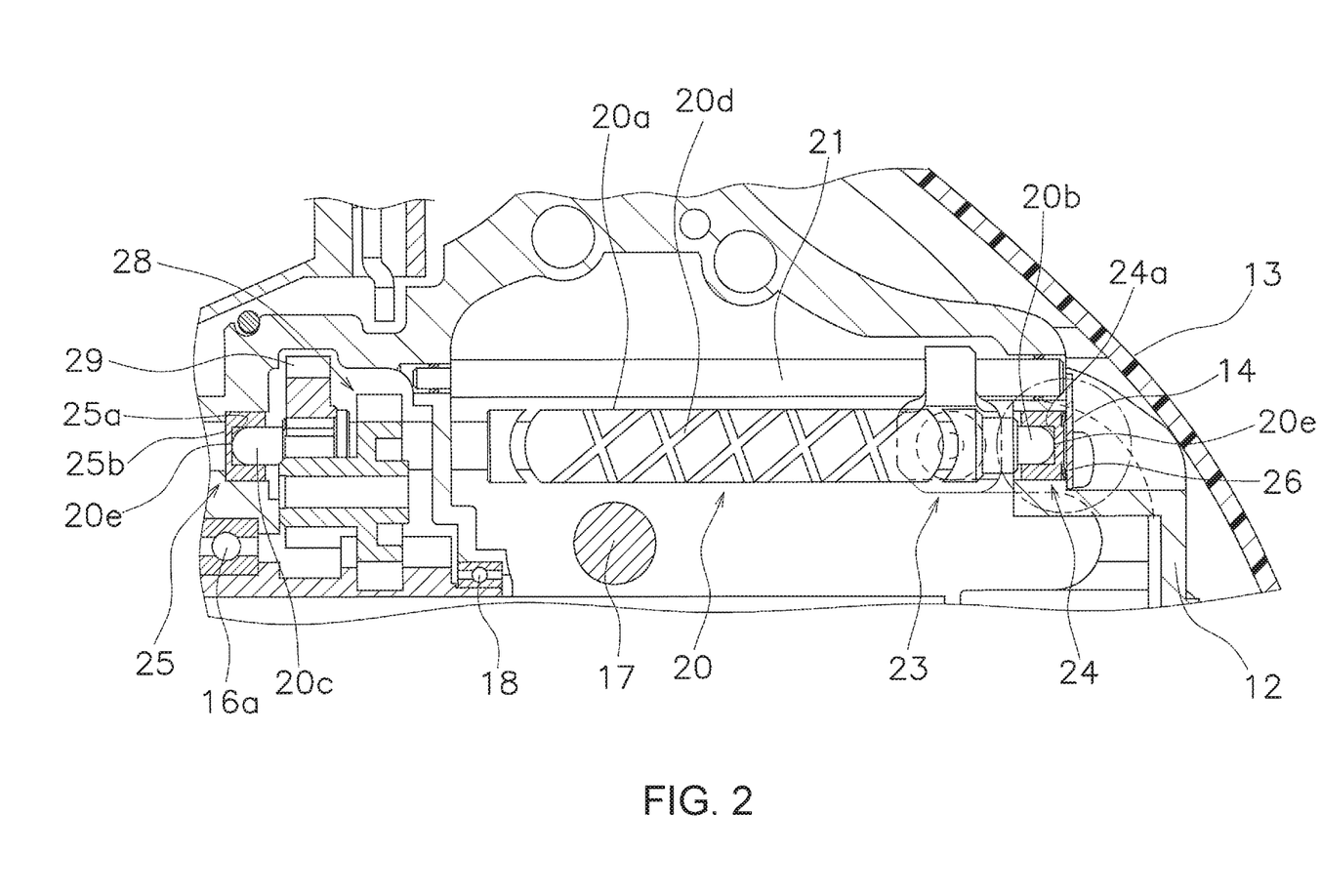
FIG. 2 is an enlarged view of a portion of FIG. 1.

As shown in FIG. 1 and FIG. 2, the reciprocating mechanism 8 comprises a worm shaft 20, a guide shaft 21, a slider 23, a first supporting member 24, a second supporting member 25, and an elastic member 26. The reciprocating mechanism 8 reciprocates the spool shaft 5 in the spool shaft direction with respect to the reel body 1 by the rotation of the handle 2. As result, when winding the fishing line by rotating the handle 2, the spool 6, which is fixed to the spool shaft 5, reciprocates in the spool shaft direction, and the fishing line evenly winds onto the spool 6.

The worm shaft 20 is disposed parallel to the spool shaft 5 in a position above the spool shaft 5. As shown in FIG. 2, the worm shaft 20 comprises a shaft portion 20a, a first shaft supporting portion 20b, and a second shaft supporting portion 20c. Intersecting spiral grooves 20d are formed on the outer surface of the shaft portion 20a.

The first shaft supporting portion 20b is disposed at the rear end of the shaft portion 20a. The second shaft supporting portion 20c is disposed at the front end of the shaft portion 20a. The first and second shaft supporting portions 20b, 20c support the shaft portion 20a with respect to the reel body 1. In particular, the first shaft supporting portion 20b is supported by the first supporting member 24 disposed on the reel body 1, the second shaft supporting portion 20c is supported by the second supporting member 25, and the worm shaft 20 is supported on the reel body 1.

The outer diameters of the first and second shaft supporting portions 20b, 20c, are smaller than the outer diameter of the shaft portion 20a. Each of the first and second shaft supporting portion 20b, 20c has a spherical portion 20e, the distal end of which is formed in a convex spherical shape.

The worm shaft 20 is rotated accompanying the rotation of the handle 2. In particular, the rotation of the pinion gear 4, which is rotated accompanying the rotation of the handle 2, is transmitted to an intermediate gear 29 integrally and rotatably mounted to a front end portion of the worm shaft 20 via a stepped gear 28 (refer to FIG. 1). The worm shaft 20 is thereby rotated accompanying a rotation of the handle 2.

As shown in FIG. 1, the slider 23 extends above and below the drive shaft 17, In addition, the slider 23 is formed such that the inner portion thereof is substantially a U-shape, curved along the outer portion of the drive shaft 17. The slider 23 is connected to the rear end portion of the spool shaft 5 by a screw, which is not shown.

The guide shaft 21 is disposed in the chassis 12 in the front-rear direction and guides the reciprocal movement of the slider 23 in the spool shaft direction. Meanwhile, the reciprocal movement of the slider 23 is also guided by another guide shaft, which is not shown, disposed on the right side of the spool shaft.

Figure 3:
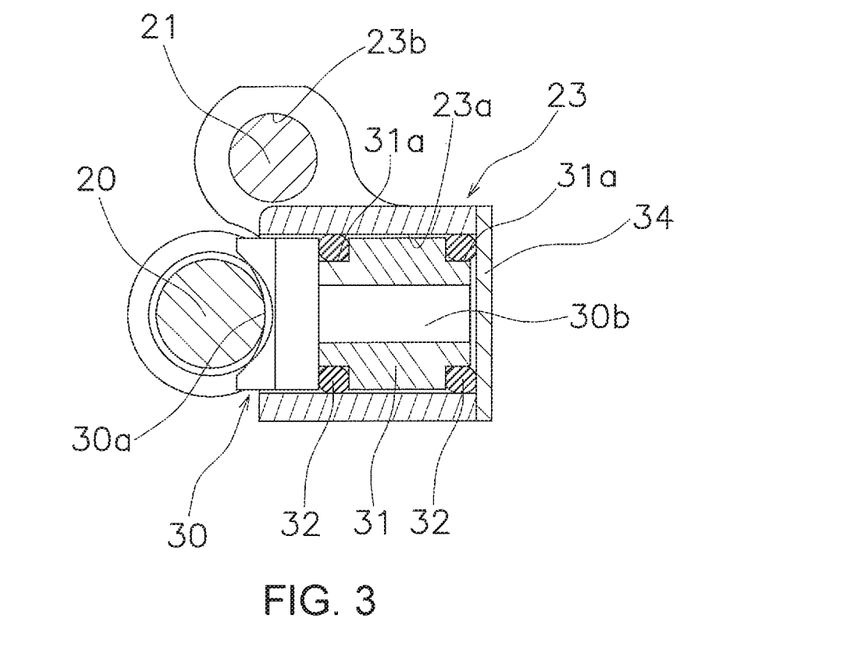
FIG. 3 is a longitudinal cross-sectional view of a portion of the slider.

Here, FIG. 3 shows a longitudinal cross-sectional of a portion of the slider 23. As shown in FIG. 3, the slider 23 comprises a housing hole 23a formed inside the slider 23, and a guide hole 23b that extends through in the spool shaft direction. An engagement member 30 engages the spiral grooves 20d of the worm shaft 20, and a tubular collar member 31 supporting the engagement member are housed in the housing hole 23a.

The guide hole 23b is formed in the upper portion of the slider 23, and the guide shaft 21 extends through the guide hole 23b.

The engagement member 30 comprises an engagement portion 30a engaged with the spiral grooves 20d, and a mounting shaft portion 30b, having a smaller diameter than the engagement portion 30a. The slider 23 reciprocates in the spool shaft direction in accordance with the rotation of the worm shaft 20, by the engagement portion 30a engaging the spiral grooves 20d of the worm shaft 20. The engagement portion 30a is retained by the housing hole 23a, with a portion thereof protruding from the housing hole 23a. The mounting shaft portion 30b is rotatably supported in the collar member 31, which is housed inside the slider 23.

The collar member 31 comprises annular grooves 31a recessed radially inwardly on the outer perimeter edges at both ends. Elastic members 32 are mounted in the annular grooves 31a. Elastic members 32 are elastic bodies made of an elastically deformable resin, or the like, for example O-rings. The elastic members 32 are disposed abutting the housing hole 23a, and a plate-like member 34 is screwed to the slider 23. Backlash in the radial direction and the axial direction of the engagement member 30 is thereby suppressed. The collar member 31 is retained by the plate-like member 34.

A prescribed gap is disposed between the collar member 31, and the plate-like member 34 and the housing hole 23a. The engagement member 30 supported in the collar member 31 is automatically centered with the spiral grooves 20d of the worm shaft 20 by this prescribed gap. When the elastic members 32 are elastically deformed by a prescribed amount, the collar member 31 abuts the housing hole 23a or the plate-like member 34. As a result, when the engagement member 30 receives a large load, the movement of the engagement member 30 is regulated by the housing hole 23a and the plate-like member 34, so that the engagement member 30, supported in the collar member 31, will not move too much.

Figure 4:
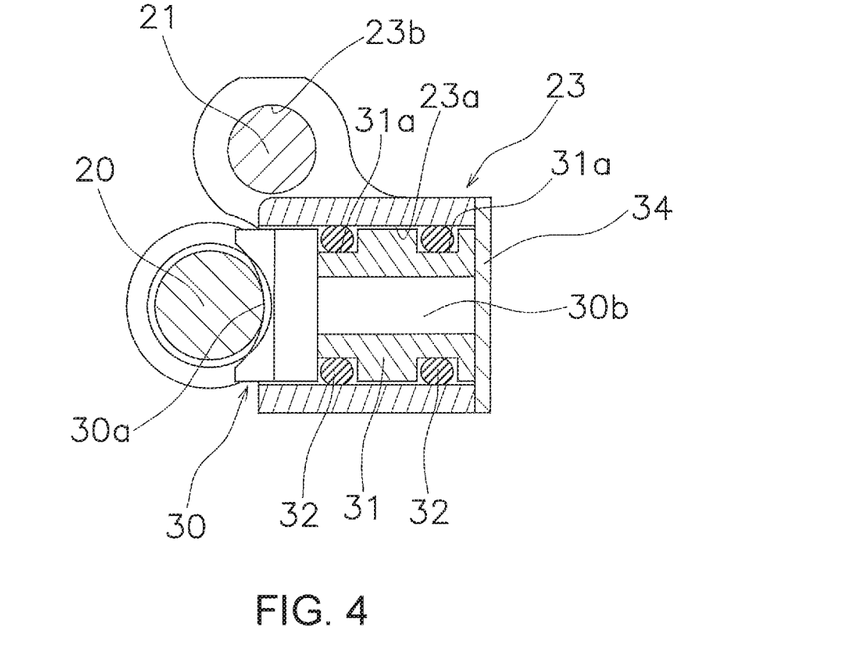
FIG. 4 is a longitudinal cross-sectional view of a portion of the slider.

Here, the backlash in the axial direction of the engagement member 30 is suppressed by the elastic members 32 by providing a prescribed gap between the collar member 31 and the plate-like member 34; however, as shown in FIG. 4, the elastic members 32 can suppress backlash only in the radial direction by providing a gap only between the collar member 31 and the housing hole 23a, without causing the elastic member 32 to come in contact with the plate-like member.

As shown in FIG. 2, the first supporting member 24 is a bottomed tubular bushing member that supports the first shaft supporting portion 20b, and is disposed at the rear end of the chassis 12. As shown enlarged in FIG. 5, the first supporting member 24 comprises a first bottom portion 24a and an annular protrusion 24b. The first bottom portion 24a has a flat shape, and the spherical portion 20e of the first shaft supporting portion 20b abuts the first bottom portion 24a. Thus, the contact portion between the first bottom portion 24a and the distal end of the first shaft supporting portion 20b is closer to a point contact rather than a surface contact. The protrusion 24b is formed protruding in the center portion of the rear end surface of the first supporting member 24.

As shown in FIG. 2, the second supporting member 25 is a bottomed tubular bushing member that supports the second shaft supporting portion 20c, and is disposed near the front end of the chassis 12. The forward movement of the second supporting member 25 in the spool shaft direction is regulated by a portion of the front end surface 25b thereof abutting the chassis 12.

The second supporting member 25 comprises a second bottom portion 25a abutting the spherical portion 20e of the second shaft supporting portion 20c. The second bottom portion 25a has a flat shape, and the spherical portion 20e of the second shaft supporting portion 20c abuts the second bottom portion 25a. Thus, the contact portion between the second bottom portion 25a and the distal end of the second shaft supporting portion 20c is also closer to a point contact rather than a surface contact.

In this manner, by forming the distal ends of the first and second shaft supporting portions 20b, 20c of the worm shaft 20 into spherical shapes, it is possible to reduce the contact area between the first and second shaft supporting portions 20b, 20c, and the first and second supporting members 24, 25. It is thereby possible to suppress an increase in the rotational torque of the worm shaft 20, even if a relatively large preload is applied between the worm shaft 20, and the first and second supporting members 24, 25.

Figure 5:
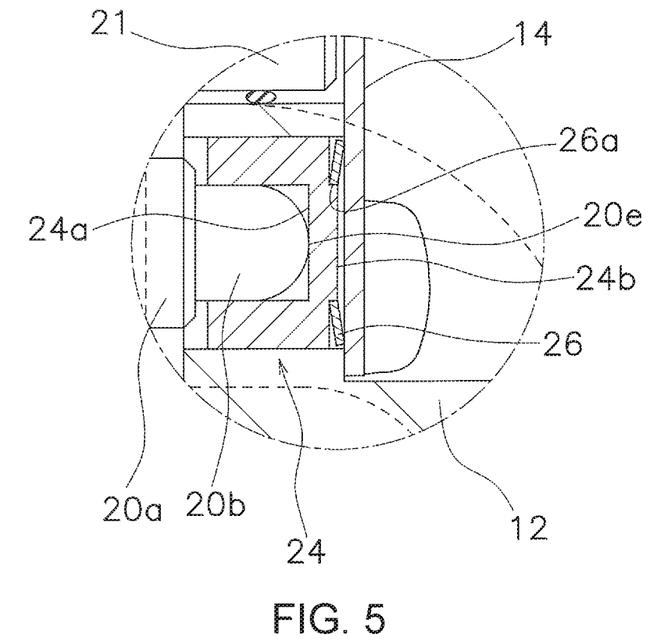
FIG. 5 is an enlarged view of a portion of FIG. 2.

The biasing member 26 biases at least one of the first supporting member 24 and the second supporting member 25 in the spool shaft direction. Here, as shown in FIG. 2 and FIG. 5, the biasing member 26 is disposed on the rear end surface of the first supporting member 24. The biasing member 26 biases the worm shaft 20, and the first and second supporting members 24, 25, which support the worm shaft 20, axially forward, to suppress backlash of the worm shaft 20 in the axial direction. In this embodiment, the biasing member 26 is a wave washer formed by bending a plain washer once. The biasing member 26 is retained by the retainer plate 14.

Figure 6:
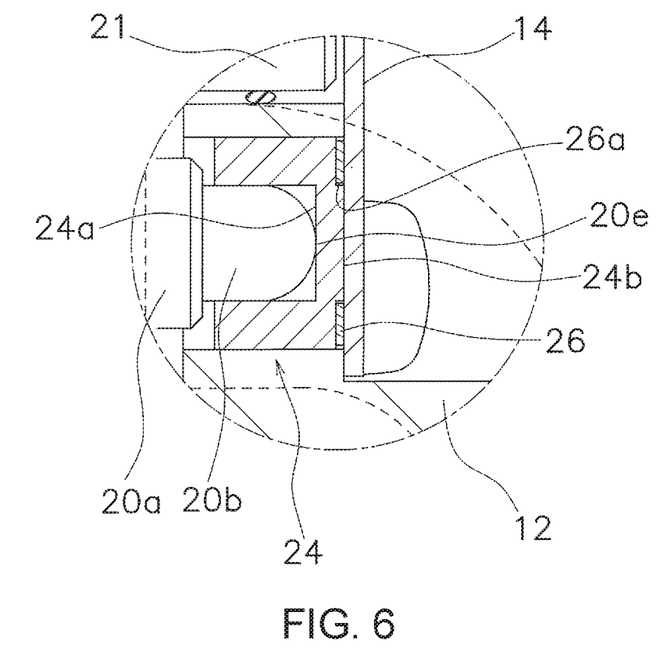
FIG. 6 is a view corresponding to FIG. 5 illustrating the compression of the biasing member.

The biasing member 26 comprises a through-hole 26a in the center. The outer diameter of the through-hole 26a is larger than the outer diameter of the protrusion 24b of the first supporting member 24, and the protrusion 24b of the first supporting member 24 is disposed in the through-hole 26a so as to be capable of extending through the through-hole 26a. Accordingly, as shown in FIG. 6, when being compressed by receiving a load in a direction that is opposite to the biasing direction of the biasing member 26 (rearward in the spool shaft direction), the protrusion 24b of the first supporting member 24 comes into contact with the retainer plate 14. As a result, even if a large load is applied rearward in the spool shaft direction due to, for example, a large impact such as the reel body 1 falling, the protrusion 24b of the first supporting member 24 comes into contact with the retainer plate 14; therefore, it is possible to avoid shear fracture and falling out of the first bottom portion 24a of the first supporting member 24.

First Modified Example

Figure 7:
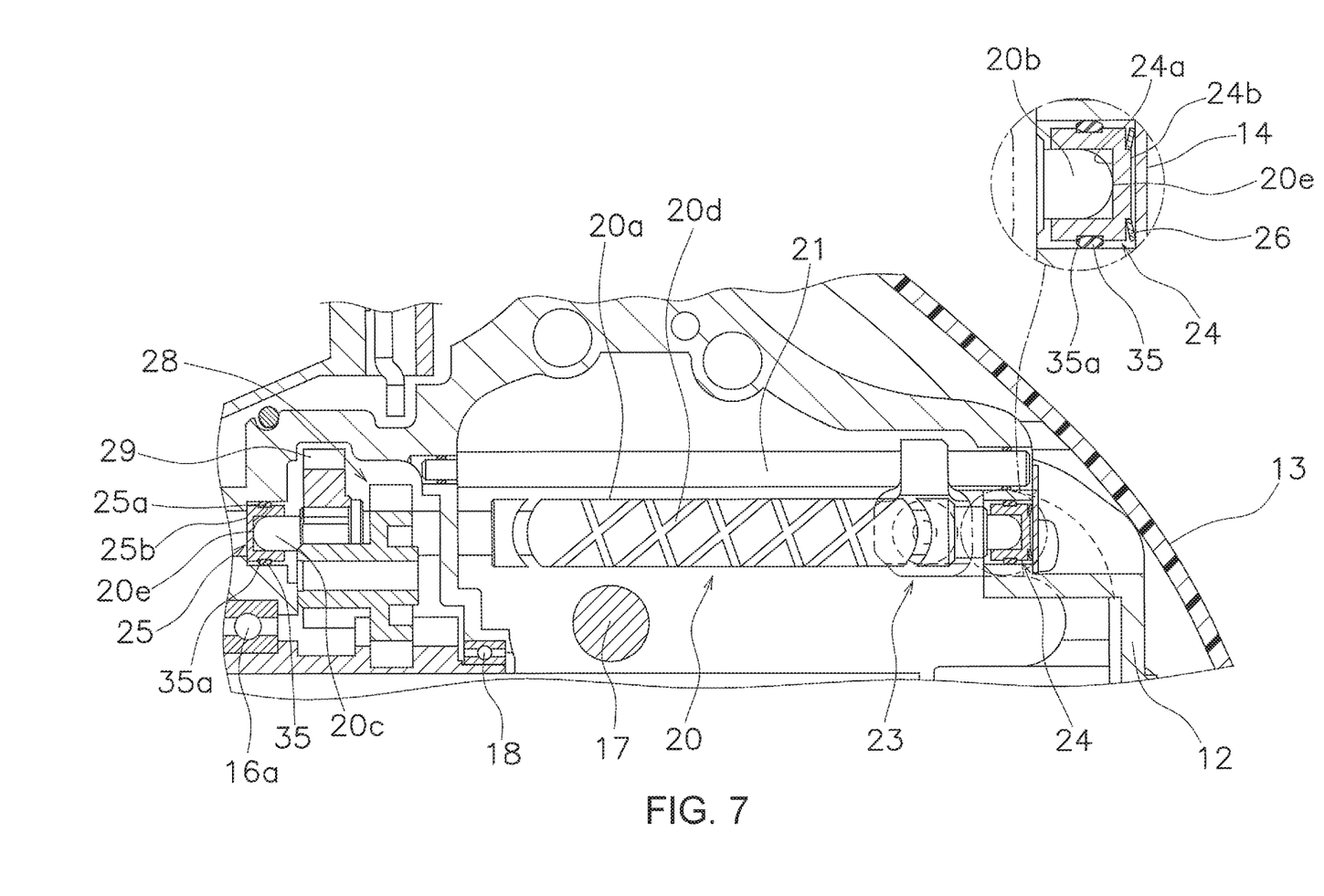
FIG. 7 is a view corresponding to FIG. 2 and FIG. 5 showing a first modified example of the first embodiment.

As shown in FIG. 7, in the first modified example of the first embodiment, the first supporting member 24 and the second supporting member 25 are supported on the reel body 1 via an elastic member 35. In particular, an annular groove 35a for retaining the elastic member 35 is recessed radially inwardly on the outer perimeter of each of the first supporting member 24 and the second supporting member 25. The elastic member 35 is mounted in the annular groove 35a. The elastic member 35 is an elastic body made of an elastically deformable resin, or the like, for example an O-ring.

It is thereby possible to suppress the backlash of the worm shaft 20 in the radial direction with the elastic member 35. The other elements are the same as in the first embodiment. The elastic member 35 can be disposed only on one of the first supporting member 24 and the second supporting member 25.

Second Modified Example

Figure 8:
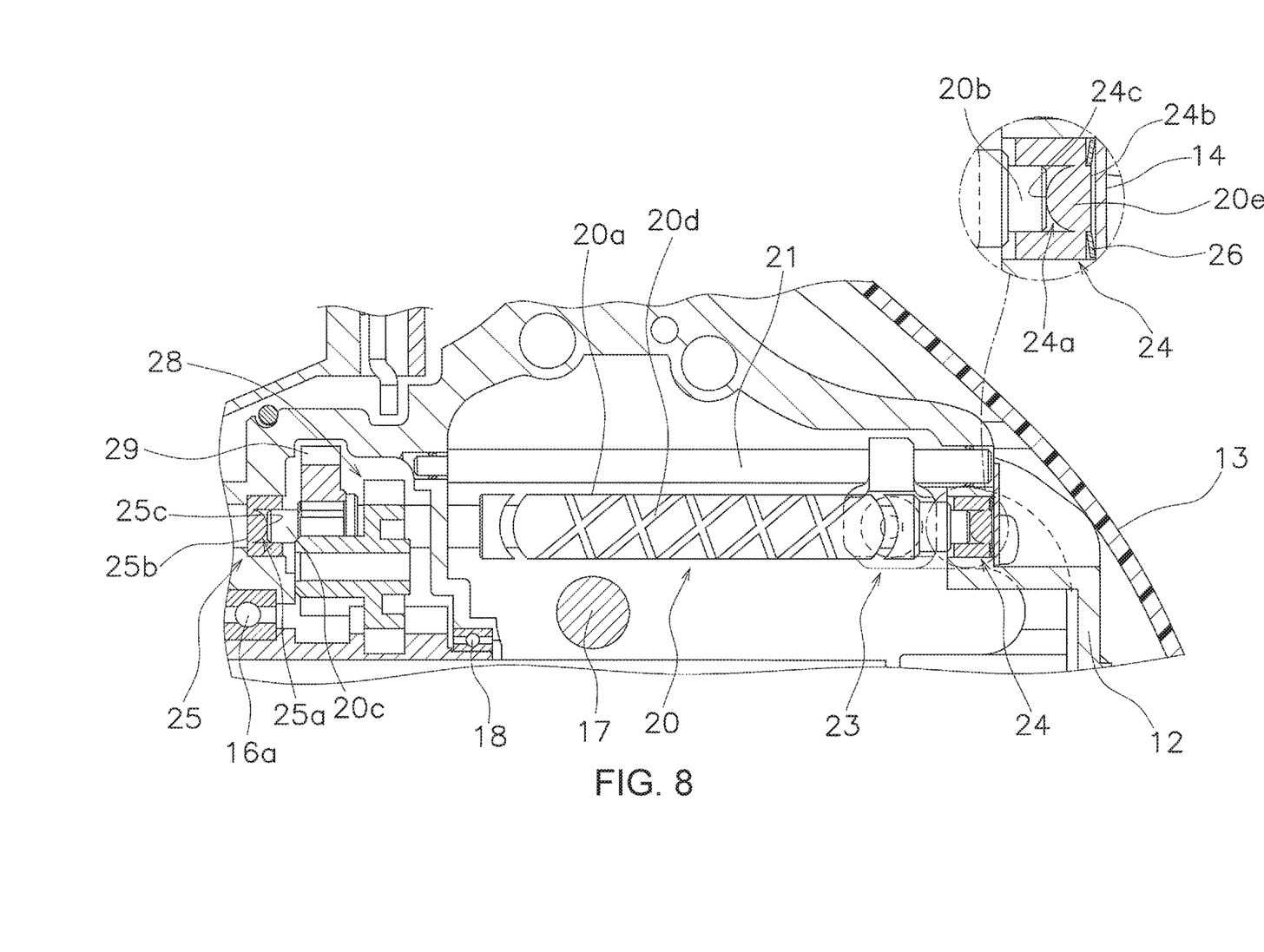
FIG. 8 is a view corresponding to FIG. 2 and FIG. 5 showing a second modified example of the first embodiment.

As shown in FIG. 8, in the second modified example of the first embodiment, the first bottom portion 24a of the first supporting member 24 and the second bottom portion 25a of the second supporting member 25 have protruding convex spherical surfaces. In particular, the first bottom portion 24a of the first supporting member 24 comprises a first projecting portion 24c that protrudes in a convex spherical shape toward the first shaft supporting portion 20b, and the first projecting portion 24c abuts the distal end of the first shaft supporting portion 20b, The second bottom portion 25a of the second supporting member 25 comprises a second projecting portion 25c that protrudes in a convex spherical shape toward the second shaft supporting portion 20c, and the second projecting portion 25c abuts the distal end of the second shaft supporting portion 20c. In this embodiment, the distal ends of each of the first shaft supporting portion 20b and the second shaft supporting portion 20c are formed in a planar shape, rather than a spherical shape.

In this embodiment, it is possible to reduce the contact surface between the first and second shaft supporting portions 20b, 20c, and the first and second supporting members 24, 25. It is thereby possible to suppress an increase in the rotational torque of the worm shaft 20, even if a large preload is applied between the worm shaft 20, and the first and second supporting members 24, 25. The other elements are the same as in the first embodiment. Meanwhile, a first projecting portion 24c or a second projecting portion 25c can be disposed only on one of the first bottom portion 24a and the second bottom portion 25a. Furthermore, the distal end of at least one of the first and second shaft supporting portions 20b, 20c can be formed by a spherical portion 20e.

Figure 9:
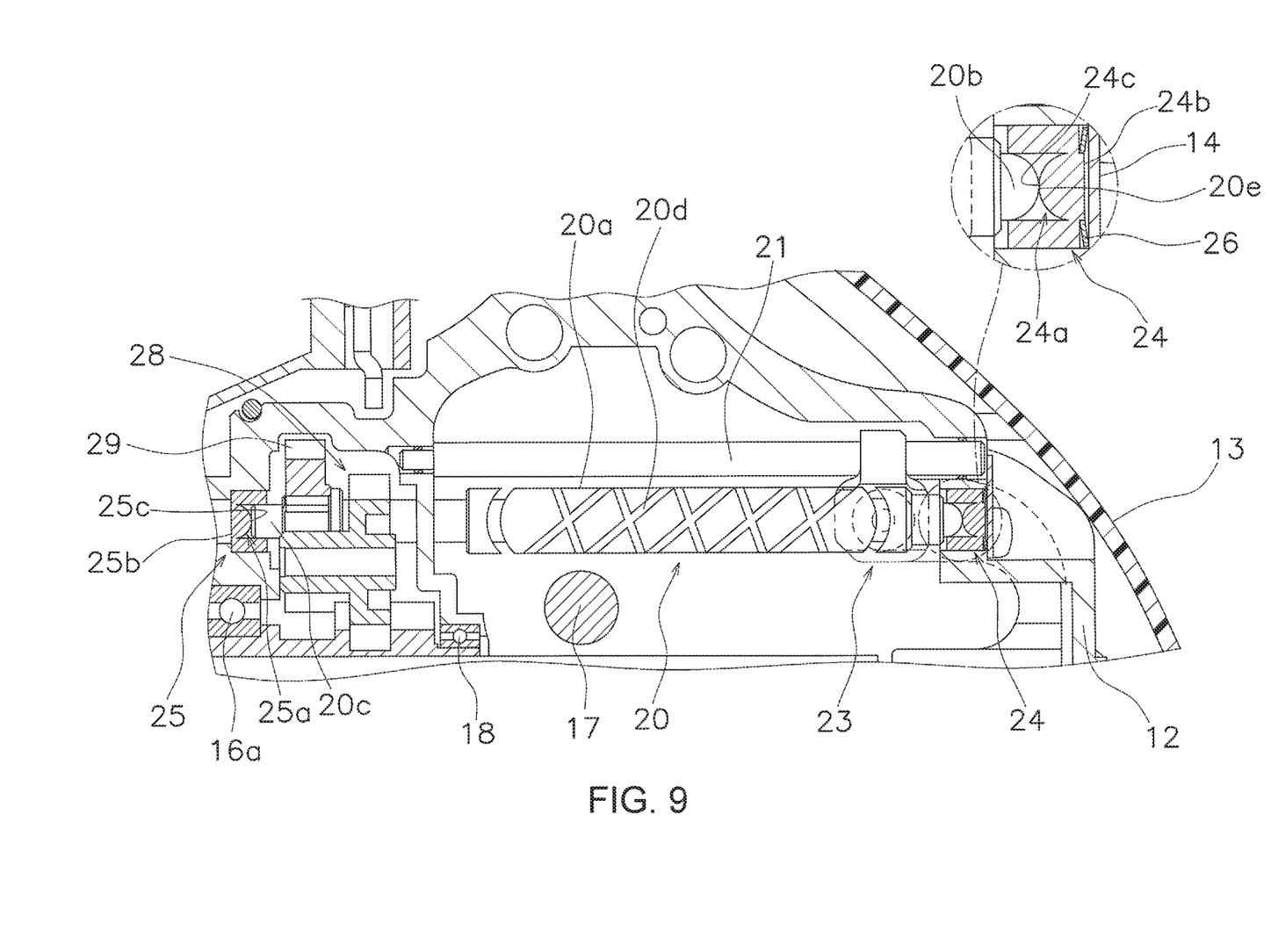
FIG. 9 is a view corresponding to FIG. 2 and FIG. 5 showing the second modified example of the first embodiment.

As shown in FIG. 9 a spherical portion 20e can be disposed on the first shaft supporting portion 20b, and the spherical portion 20e and the first projecting portion 24c can be formed to abut each other.

Third Modified Example

Figure 10:
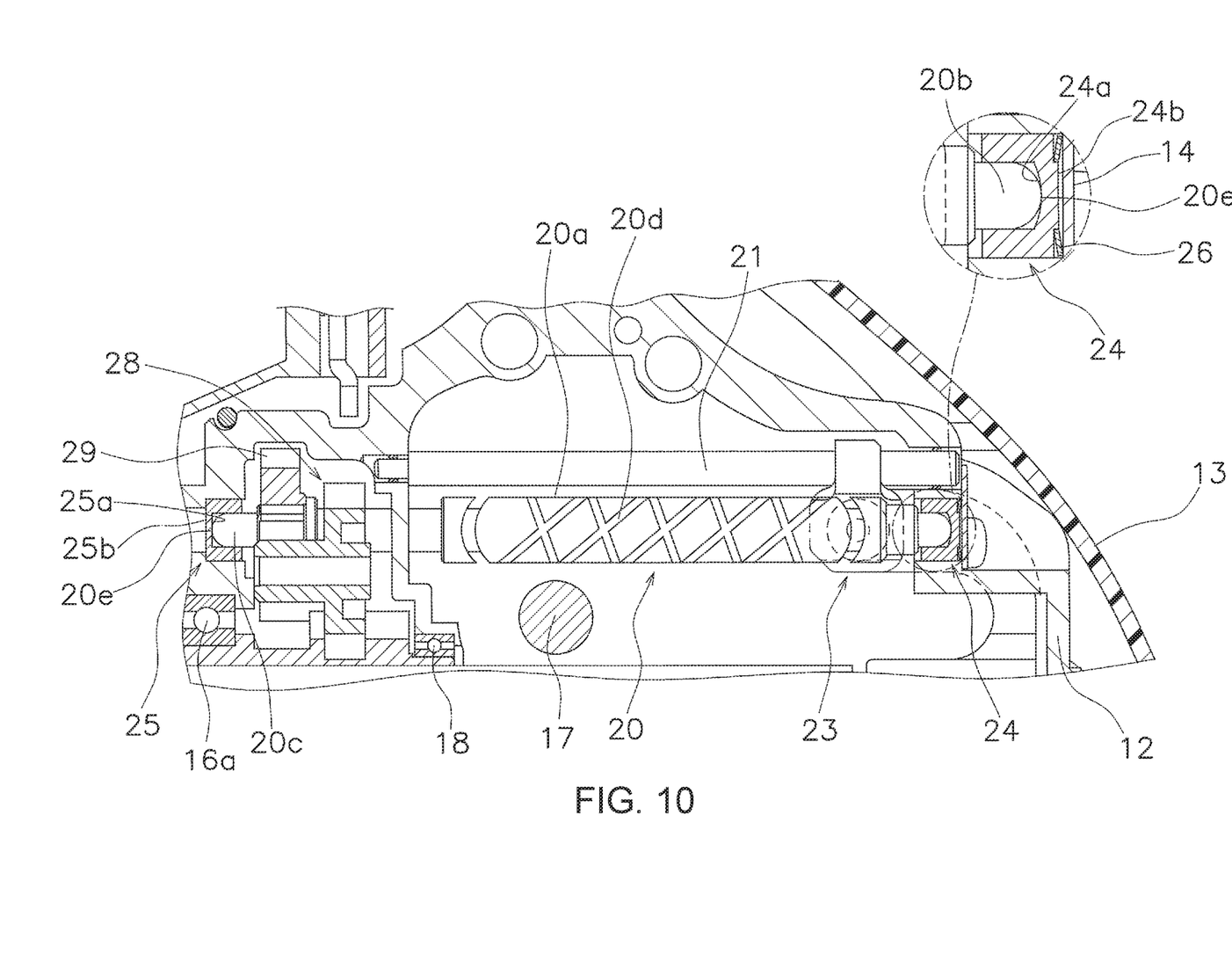
FIG. 10 is a view corresponding to FIG. 2 and FIG. 5 showing a third modified example of the first embodiment.

As shown in FIG. 10, in the third modified example of the first embodiment, the first bottom portion 24a of the first supporting member 24 is recessed in a concave spherical shape. The first bottom portion 24a, which is the contact surface of the spherical portion 20e of the first shaft supporting portion 20b, has a gentler spherical surface than the spherical portion 20e of the first shaft supporting portion 20b. As a result, there is an automatic centering effect when a preload is applied between the worm shaft 20, and the first and second supporting members 24, 25. Further, since the contact area between the first bottom portion 24a of the first supporting member 24 and the spherical portion 20e of the first shaft supporting portion 20b is also reduced, it is also possible to suppress an increase in the rotational torque of the worm shaft 20. The second bottom portion 25a of the second supporting member 25 can also have a concave spherical shape, in the same manner as the first bottom portion 24a.

Fourth Modified Example

Figure 11:
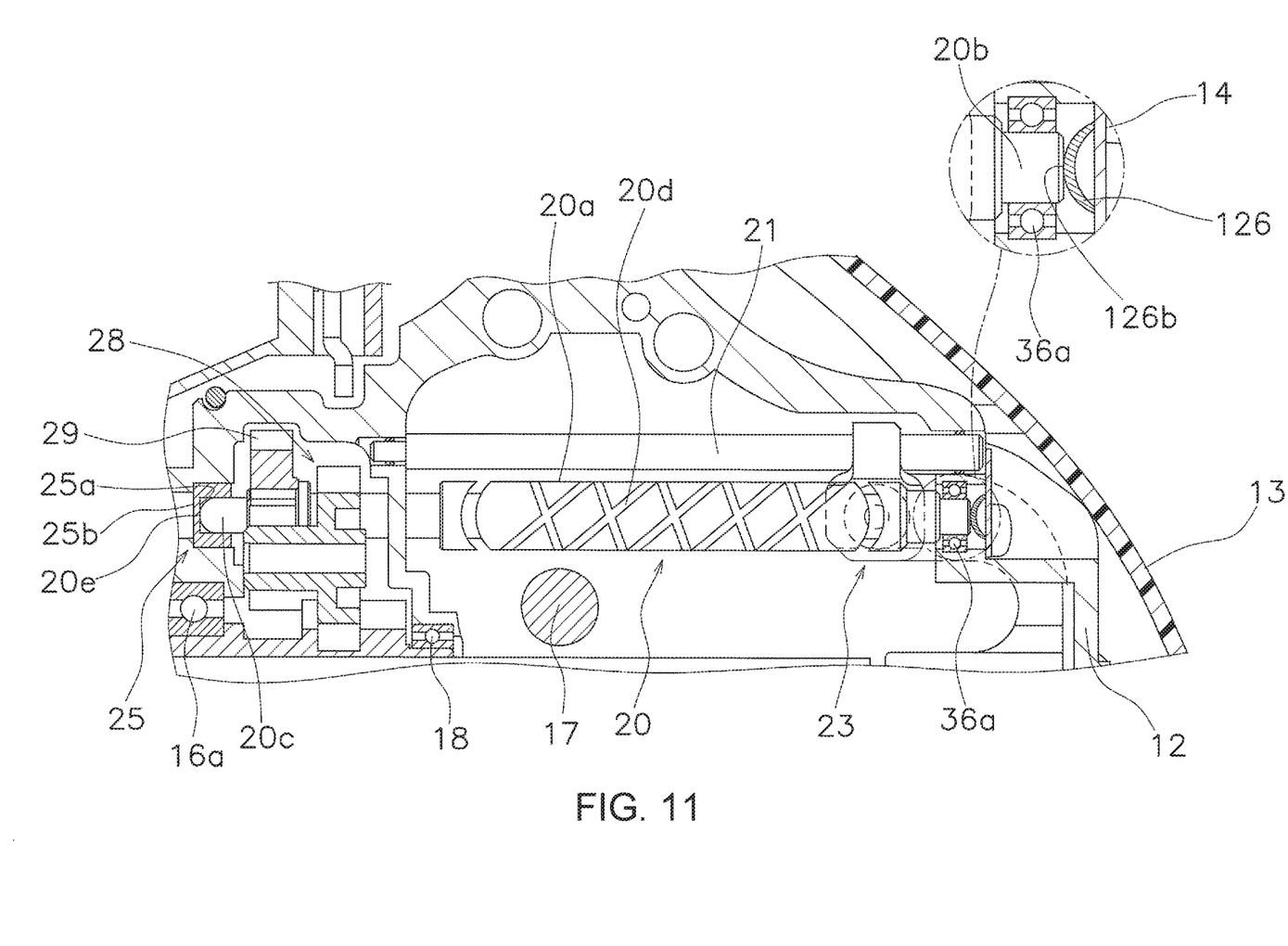
FIG. 11 is a view corresponding to FIG. 2 and FIG. 5 showing a fourth modified example of the first embodiment.

As shown in FIG. 11, in the fourth modified example of the first embodiment, in place of the first supporting member 24, the first shaft supporting portion 20b is supported by an axle bearing member 36a disposed in the rear end portion of the chassis 12. A biasing member 126 abuts the spherical portion 20e of the first shaft supporting portion 20b, and directly biases the worm shaft 20 forward in the spool shaft direction. The biasing member 126 comprises a projecting portion 126b protruding on the shaft portion 20a side of the worm shaft 20 in a convex spherical shape. In particular, the biasing member 126 is a dome washer, and is disposed such that the center of the protrusion of the projecting portion 126b abuts the distal end of the first shaft supporting portion 20b. The other elements are the same as in the first embodiment. In FIG. 11, the first shaft supporting portion 20b of the worm shaft 20 is formed in a planar shape, but the distal end of the first shaft supporting portion 20b can be formed to have a spherical portion 20e as well. In addition, the distal end of the second shaft supporting portion 20c can be formed in a planar shape as well.

Figure 12:
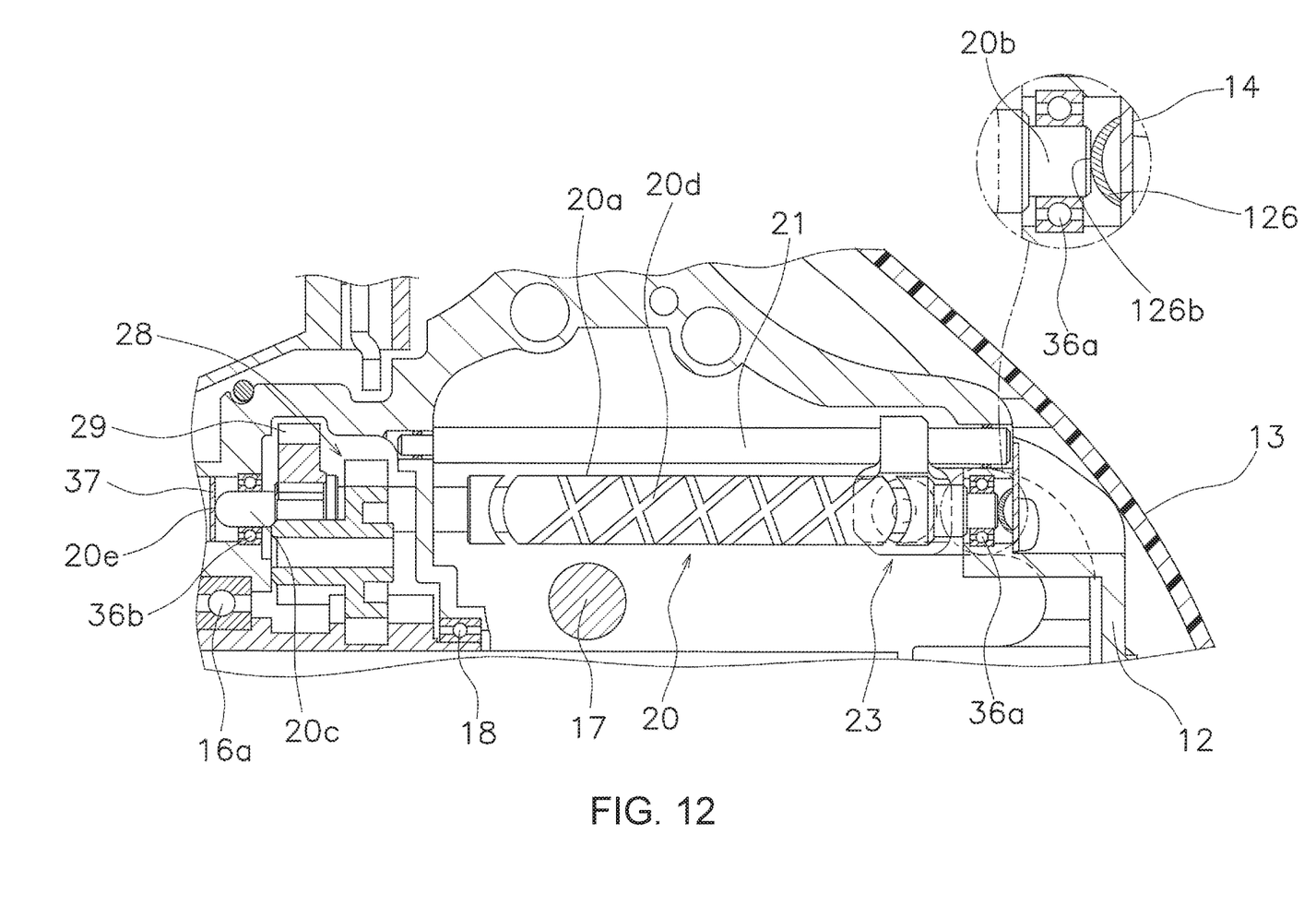
FIG. 12 is a view corresponding to FIG. 2 and FIG. 5 showing a fourth modified example of the first embodiment.

Additionally, as shown in FIG. 12, the second shaft supporting portion 20c can be supported by an axle bearing member 36b that is disposed in the vicinity of the front end of the chassis 12, and the spherical portion 20e of the second shaft supporting portion 20c can be formed to abut a plate-like retainer plate 37 that is fixed to the chassis 12.

Fifth Modified Example

Figure 13:
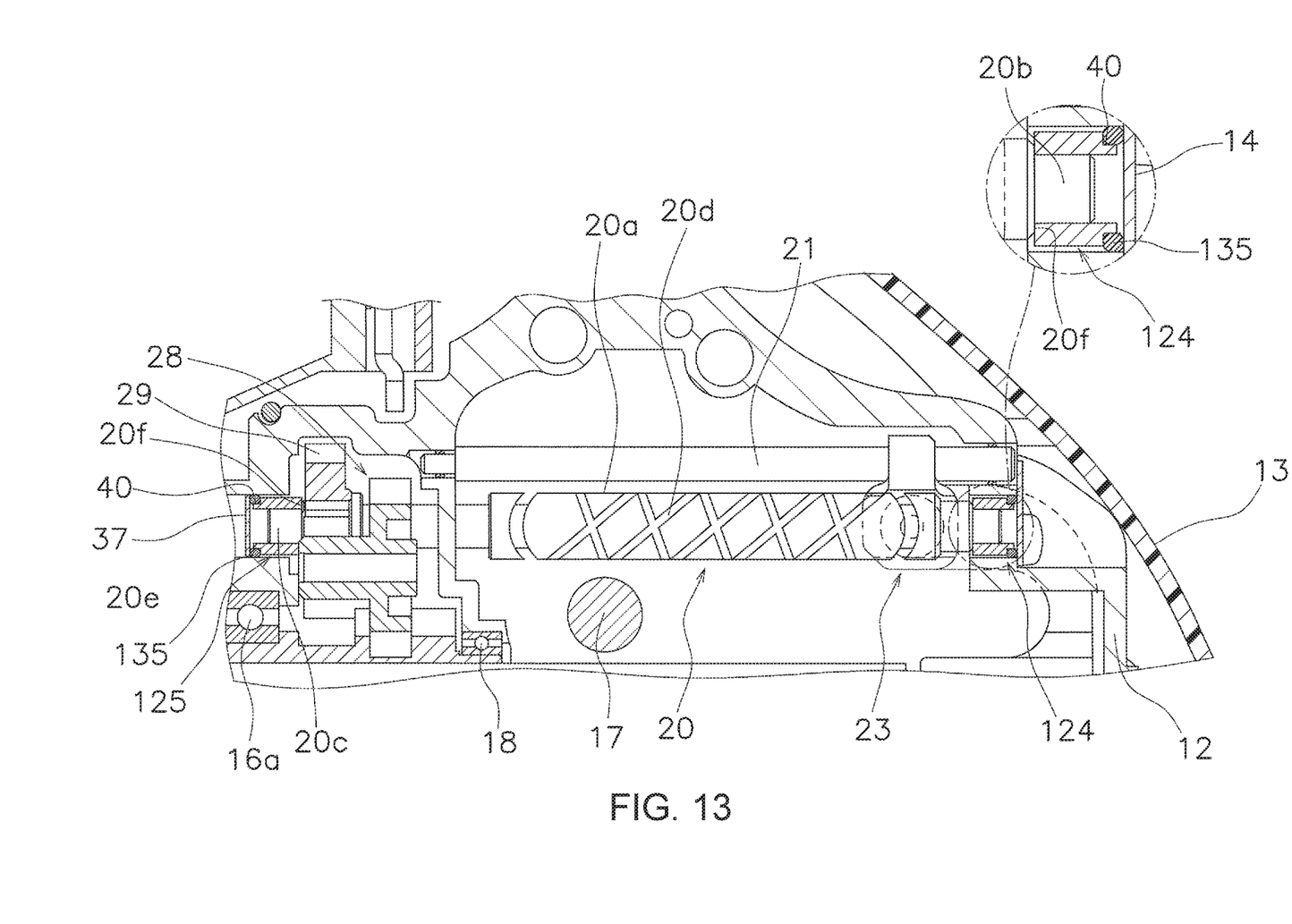
FIG. 13 is a view corresponding to FIG. 2 and FIG. 5 showing a fifth modified example of the first embodiment.

As shown in FIG. 13, in the fifth modified example of the first embodiment, the first and second supporting members 124, 125 are formed from tubular collar members. A groove 40 for mounting an elastic member 135, recessed radially inwardly, is formed on the outer perimeter edge of each of the first and second supporting members 124, 125. In this embodiment, an elastic member 135 (one example of a biasing member) is used as a biasing member. The elastic member 135 is a body made of an elastically deformable resin, or the like, for example an O-ring. The other elements are the same as in the first embodiment. Meanwhile, in this embodiment, the distal end of each of the first and second shaft supporting portions 20b, 20c is formed in a planar shape, but the distal end of at least one, or the distal ends of both, of the first and second shaft supporting portions 20b, 20c, can be formed to have a spherical portion 20e.

The first and the second supporting members 124, 125 are supported on the reel body 1 via the elastic member 135. In particular, the elastic member 135 mounted in the groove 40 of the first supporting member 124 abuts the chassis 12 and the retainer plate 14. A prescribed gap is disposed between the first supporting member 124, and the chassis 12 and the retainer plate 14, and the first supporting member can move in the radial direction and the axial direction when the elastic member 135 is elastically deformed. Meanwhile, the front end of the first supporting member 124 abuts a shaft flange portion 20f of the worm shaft 20, which has a larger diameter than the outer diameter of the first shaft supporting portion 20b.

The elastic member 135 mounted in the groove 40 of the second supporting member 125 abuts the chassis 12 and the retainer plate 37. A prescribed gap is disposed between the second supporting member 125, and the chassis 12 and the retainer plate 37, so the second supporting member 125 can move in the radial direction and the axial direction when the elastic member 135 is elastically deformed. Meanwhile, the rear end of the second supporting member 125 abuts a shaft flange portion 20f of the worm shaft 20, which has a larger diameter than the outer diameter of the second shaft supporting portion 20c.

In this manner, it is possible to suppress the backlash in the radial direction and the axial direction of the worm shaft 20, by providing an elastic member 135 between the reel body 1, and the first and second supporting members 124, 125. Furthermore, there is an automatic centering effect, since the first supporting member 124 and the second supporting member 125 are capable of moving accompanying an elastic deformation of the elastic member 135. When the elastic member 135 is elastically deformed by a prescribed amount, the first and second supporting members abut the chassis 12 or the retainer plate 14, 37. As a result, when the worm shaft 20 receives a large load, the movement of the worm shaft 20 is regulated by the chassis 12 and the retainer plate 14, 37, so that the worm shaft 20 will not move too much.

Sixth Modified Example

Figure 14:
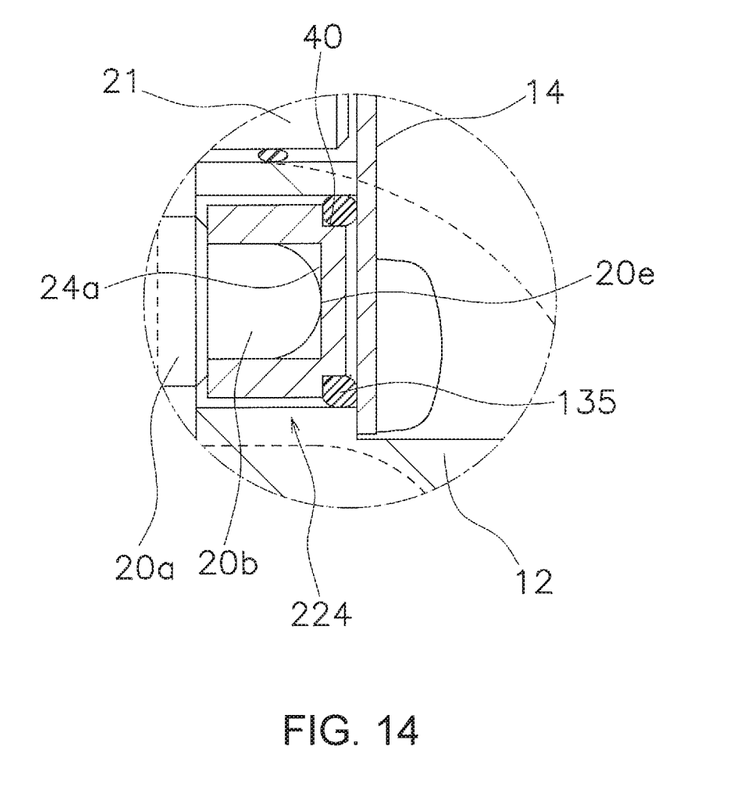
FIG. 14 is a view corresponding to FIG. 5 showing a sixth modified example of the first embodiment.

As shown in FIG. 14, in the sixth modified example of the first embodiment, the biasing member 26 is formed by the elastic member 135 described in the fifth modified example. The elastic member 135 is mounted in a groove 40 recessed radially inwardly on the outer perimeter edge of the first supporting member 224. A prescribed gap is disposed between the first supporting member 224, and the chassis 12 and the retainer plate 14. Here, when the elastic member 135 is elastically deformed by a prescribed amount, an end surface of the first supporting member 224 abuts the retainer plate 14, it is not necessary to provide a protrusion 24b on the rear end surface of the first supporting member 224. Here, a prescribed gap is also provided between the first supporting member 224 and the chassis 12, but it is possible to form the first supporting member 224 and the chassis 12 without a prescribed gap therebetween.

Other Embodiments

One embodiment of the present invention was described above, but the present invention is not limited to the above-described embodiment, and various modifications can be made without departing from the scope of the invention. Especially, the various embodiments and modified examples described in the present Specification can be freely combined according to necessity.

In the above-described embodiment, a reciprocating mechanism 8 for a fishing reel was employed in a spinning reel, but the present invention is not limited thereto. For example, the present invention can be applied to a level winding mechanism of a dual-bearing reel and an oscillating mechanism of a spin cast reel.

In the above-described embodiment, a spherical portion 30e was disposed on both the first shaft supporting portion 20b and the second shaft supporting portion 20c, but a spherical portion can be disposed on only the first shaft supporting portion 20b. Further, the first shaft supporting portion 20b can be disposed on the front end of the shaft portion 20a, and the second shaft supporting portion 20c can be disposed on the rear end of the shaft portion 20a.

In the above-described embodiment, a protrusion 24b is disposed on the first supporting member 24, but it is not necessary to dispose a protrusion 24b; it is sufficient if the contact area between the first and second shaft supporting portions 20b, 20c, and the first and second supporting members 24, 25 is reduced. In the same manner, in the first embodiment, an elastic member 35 is mounted in an annular groove 35a formed in the outer surface of each of the first supporting member 24 and the second supporting member 25, but it is not necessary to provide an annular groove 35a and an elastic member 35.

In the above-described embodiment, a wave washer is used as the biasing member 26, 126; however, the biasing member 26, 126 can be a disc spring, or a curved plate protruding on the shaft portion 20a side of the worm shaft 20 in a convex spherical shape.

In the first embodiment, an elastic member 35 is mounted in an annular groove 35a formed on the outer surface of each of the first supporting member 24 and the second supporting member 25, but this configuration can be appropriately combined with the configuration of the first modified example, second modified example, and the third modified example.

What is claimed is:

1. A reciprocating mechanism for a fishing reel for evenly winding a fishing line onto a spool mounted on a reel body, comprising:
a worm shaft having a shaft portion with intersecting spiral grooves formed on an outer surface thereof, a first shaft supporting portion supporting the shaft portion with respect to the reel body at a first end of the shaft portion and having a spherical portion at a distal end formed in a convex spherical shape, and a second shaft supporting portion supporting the shaft portion with respect to the reel body at a second end of the shaft portion;
a first supporting member with a bottomed tubular shape, having a first bottom portion abutting the spherical portion of the first shaft supporting portion of the worm shaft, and being disposed on the reel body to support the first shaft supporting portion of the worm shaft;
a second supporting member with a bottomed tubular shape, having a second bottom portion abutting the second shaft supporting, portion of the worm shaft, and being disposed on the reel body to support the second shaft supporting portion of the worm shaft; and,
a biasing member biasing at least one of the first supporting member and the second supporting member in an axial direction.

2. The reciprocating mechanism according to claim 1, wherein
the second shaft supporting portion comprises a spherical portion formed in a convex spherical shape at a distal end.

3. The reciprocating mechanism according to claim 1, wherein
at least one of the first bottom portion of the first supporting member and the second bottom portion of the second supporting member protrudes in a convex spherical shape on a shaft portion side of the worm shaft, and abuts at least one of the first and the second shaft supporting portions of the worm shaft.

4. The reciprocating mechanism according to claim 1, wherein
the first bottom portion of the first supporting member is recessed in a concave spherical shape.

5. A reciprocating mechanism for a fishing reel for evenly winding a fishing line to a spool mounted to a reel body, comprising:
a worm shaft having a shaft portion with intersecting spiral grooves formed on an outer surface thereof, and first and second shaft supporting portions for supporting the shaft portion with respect to the reel body, respectively provided at two ends of the shaft portion;
a first supporting member with a bottomed tubular shape, having a first bottom portion protruding on a shaft portion side of the worm shaft in a convex spherical shape abutting the first shaft supporting portion of the worm shaft, and being disposed on the reel body to support the first shaft supporting portion of the worm shaft;
a second supporting member with a bottomed tubular shape, having a second bottom portion abutting the second shaft supporting portion of the worm shaft, and being disposed on the reel body to support the second shaft supporting portion of the worm shaft; and
a biasing member biasing at least one of the first supporting member and the second supporting member in an axial direction.

6. The reciprocating mechanism according to claim 5, wherein
the second bottom portion of the second supporting member protrudes on the shaft portion side of the worm shaft in a convex spherical shape.

7. The reciprocating mechanism according to claim 5 wherein
the biasing member has a through-hole that extends through the center and abuts the first supporting member;
the first supporting member has a protrusion extending through the through-hole in the center portion of an end surface; and
the protrusion extends through the through-hole and abuts the reel body, when receiving a load in a direction opposite to a biasing direction of the biasing member.

8. The reciprocating mechanism according to claim 5, further comprising an elastic member supporting at least one of the first supporting member and the second supporting member on the reel main body, mounted on an outer perimeter of at least one of the first supporting member and the second supporting member.

9. A reciprocating mechanism for a fishing reel for evenly winding a fishing line onto a spool mounted on a reel main body, comprising:
   a worm shaft having a shaft portion with intersecting spiral grooves formed on an outer perimeter surface thereof, and first and second shaft supporting portions configured to support the shaft portion with respect to the reel body, respectively provided at two ends of the shaft portion; and
   a biasing member having a protruding projecting portion on a shaft portion side of the worm shaft in a convex spherical shape, and abutting the first shaft supporting portion of the worm shaft to bias the worm shaft in an axial direction.

10. The reciprocating mechanism according to claim 9, wherein
    at least one of the first shaft supporting portion and the second shaft supporting portion comprises a spherical portion formed in a convex spherical shape at a distal end.

* * * * *